United States Patent [19]

Bonn

[11] Patent Number: 5,362,388
[45] Date of Patent: Nov. 8, 1994

[54] FILTER PLATE FOR A PLATE FILTER PRESS

[75] Inventor: Heinz Bonn, Kreuzau-Winden, Germany

[73] Assignee: Eberhard Hoesch & Söhne GmbH Verfahrens-und Anlagentechnik, Düren, Germany

[21] Appl. No.: 861,867

[22] PCT Filed: Aug. 22, 1991

[86] PCT No.: PCT/EP91/01594
§ 371 Date: Aug. 17, 1992
§ 102(e) Date: Aug. 17, 1992

[87] PCT Pub. No.: WO92/06760
PCT Pub. Date: Apr. 30, 1992

[30] Foreign Application Priority Data

Oct. 17, 1990 [DE] Germany .................. 4032937

[51] Int. Cl.⁵ .............................. B01D 25/21
[52] U.S. Cl. ..................... 210/230; 210/450
[58] Field of Search ........... 210/231, 450, 232, 230

[56] References Cited

U.S. PATENT DOCUMENTS

| 3,888,769 | 6/1975 | Schotten et al. | 21  '231 X |
| 4,741,826 | 5/1988 | Geuenich et al. | 2  ,231 X |
| 4,749,482 | 6/1988 | Bonn | 210/231 |

FOREIGN PATENT DOCUMENTS

| 2589080 | 4/1987 | France . |
| 2324876 | 12/1974 | Germany . |
| 8512696 | 4/1986 | Germany . |
| 8704934 | 5/1987 | Germany . |
| 2176418 | 12/1986 | United Kingdom . |

*Primary Examiner*—Frank Spear
*Attorney, Agent, or Firm*—Spencer, Frank & Schneider

[57] ABSTRACT

The invention relates to a filter plate for a plate filter press with at least one press diaphragm (6) covered with filter fabric, in which the filter plate (2) and the press diaphragm (6) have at least one shared passage aperture (4), whereby the edge of the aperture (4) of the press diaphragm (6) has a circumferential edge bead (9) which is held in a groove (10) at the edge of the aperture (4) of the filter plate (2) by means of an annular securing component so as to create a seal. In order to ensure that the press diaphragm (6) can reliably withstand high pressures in this region it is proposed that the aperture (4) of the filter plate (2) be conically shaped towards the central plane of the filter plate (2) on the side bearing the press diaphragm (6), that the groove (10) taking the edge bead (9) of the press diaphragm (6) be arranged in the conical region (13) and that the securing component for the edge bead (9) of the press diaphragm (6) be formed by a conically shaped clamping ring (15) on the outer periphery and stretched over the filter plate (3).

11 Claims, 3 Drawing Sheets

FILTER PLATE FOR A PLATE FILTER PRESS

BACKGROUND OF THE INVENTION

1. Field of the Invention

The invention relates to a filter plate for a plate filter press including at least one press membrane covered by a filter cloth, wherein the filter plate and the press membrane have at least one common passage opening. The edge of the passage opening of the press membrane is provided with a continuous edge bead that is sealingly held in a groove along the edge of the passage opening of the filter plate by means of an annular fastening element.

2. Description of the Related Art

Such filter plates including a press membrane are known in principle in practice. A problem in connection with these plates is the connection between the press membrane and the plate body because during the pressing process a pressure medium is introduced between the plate body and the press membrane such that the press membrane is lifted away from the plate body. While the closing pressure also holds the press membrane itself against the filter plate in the edge region of the filter plate, the fixing in the region of the passage opening, particularly in the region of the slurry channel, poses a problem. In practice, the fastening in this region has in the past always been effected, for example, by simple gluing or vulcanizing of the edges of the press membrane to the plate body. However, gluing is not very reliable because extensive shear forces are generated during the pressing process which may cause the adhesive connection to come loose, particularly since, in contrast to fastening the membrane edges to the outer plate edge, the press membrane and the plate body are not supported by the press closing force in the region of the slurry entrance so that the adhesive connection in this region is subjected to great stress.

German Patent 2,324,876 discloses the provision of a continuous groove in the region of the filter plate center plane for the passage bore of the filter plate that is provided with press membranes. The edge bead of the press membrane is inserted into this continuous groove and a slotted spring ring is pushed over it. This spring ring is then held by engagement with a closed ring as the supporting ring. Such a fastening does not permit very high compressive forces. These can be realized, if instead of the supporting ring, a fastening is provided as it is known as a so-called cloth screw fastening. The screw-in flanges screwed against one another by a screwed-in threaded sleeve, which thus also clamp in the filter cloth, have been found acceptable in practice but have the drawback that filter presses equipped in this manner, can be used only within limits to process aggressive slurries. Charging the press membrane with a compressive pressure of up to 3 bar is possible. If higher pressures are employed there again exists the danger that the press membrane will be pulled out of its anchorage.

SUMMARY OF THE INVENTION

It is an object of the invention to provide a filter plate of the above-identified type which ensures secure anchorage of the press membrane in the region of the passage openings in the plate body and also permits the use of filter cloths which cover the press membrane.

This is accomplished according to the invention in that the passage opening of the filter plate, on the side supporting the press membrane, is configured to be conically tapering toward the center plane of the filter plate; the groove to accommodate the edge bead of the press membrane is disposed in the conically tapering region and the fastening element for the edge bead of the press membrane is formed by a conically shaped clamping ring at its outer edge, with this ring being fastened to the filter plate in a tightenable manner. Such an arrangement has the advantage that the edge of the passage opening of the press membrane can be clamped in with a defined pressure by way of the clamping ring, with the special orientation of the groove in addition to the friction lock also bringing about an improvement in the form-locking anchorage of the edge region of the passage opening of the press membrane. Such a configuration makes it possible to employ pressures up to 15 bar so that a considerable increase in performance can be realized. For filter plates which are provided with press membranes on both sides, the mirror symmetrically arranged clamping rings may be connected with one another by way of simple screw bolts.

In a preferred embodiment of the invention it is provided that the filter plate includes, in the region of its center plane, a continuous holding web which projects over the groove toward the center of the passage opening of the filter plate and to which the clamping ring can be clamped. This arrangement has the advantage that the clamping ring can be mechanically supported directly at the filter plate in the direction of the axis of the passage opening and thus, particularly for filter plates having press membranes on both sides, the passage opening defined on both sides by the clamping rings, if configured appropriately, can also be stressed with high axially acting forces during operation, without thus exerting too much pressure on the edge bead of the press membrane. Preferably, the edge of the passage opening of the filter plate is then given a rounded configuration in the region of its largest diameter. This rounding produces perfect contact of the press membrane during filtration operation. During pressing, that is, when the back of the press membrane is charged with a pressure medium, the press membrane is merely inverted in this region so that the press membrane is practically not stretched at all in this region.

For a filter plate made of plastic, as it must be employed especially for aggressive or corrosive media, the invention further provides that the clamping ring is also made of plastic and is provided with several axial passage bores for clamping screws and that threaded sleeves, preferably of metal, are disposed in the holding web of the filter plate as counterelements to the clamping screws. Since in this embodiment, all components except for the clamping screws and the threaded sleeves are manufactured of a chemically resistant plastic, the clamping screws and the threaded metal sleeves disposed in the filter plate can be properly sealed against the slurry and filtrate carrying regions of the filter press. For filter plates equipped with press membranes on both sides, a threaded sleeve may be employed for the clamping screws on both sides of the plate so that the tensioning forces act directly between the two clamping rings and thus the threaded sleeves need not be anchored firmly in the plastic material of the filter plate.

As an advantageous feature of the invention it is here provided that a plug of an elastomer material is inserted into the passage bores in the clamping ring at their exterior ends when the clamping screws are inserted. This plug which advisably has a greater diameter than the diameter of the passage opening for the screws and thus can be employed as a press seal, ensures that the screw is perfectly sealed against the slurry carrying regions.

Another advantageous feature of the invention provides that the walls of the passage opening and the clamping ring are covered with a tubular cuff of an elastomer material which is provided at both its ends with radially outwardly oriented covering flanges that project into the region of the filter chambers. In this way an additional seal of the fastening region relative to the slurry channel defined in the filter plate by the passage bore is obtained all the way into the filter chambers.

Another preferred feature of the invention provides that, in the region of the passage opening, the filter cloth is connected with the covering flanges of the tubular cuff. The connection may here be made by gluing, particularly, however, also by sewing. Since the tubular cuff and its covering flanges can be manufactured as a molded rubber component, it becomes possible here to shape the covering flanges in the region of their free edges so that, in the transition region from the edge of the passage opening to the filter chamber, the flanges lie elastically resiliently against the press membrane therebelow.

As a further advantageous feature of the invention it is provided that the covering flanges of the tubular cuff are provided with cushion-shaped raised portions on their exterior faces. If the filter plates are pushed together into a stack, these raised portions lie on the exterior faces of respective hump-like raised portions on fastening rings for the filter cloth of the adjacent plates in which are disposed passage holes for their fastening screws. This arrangement has the advantage that the receiving bores for the fastening screws, which advisably are also sealed off by a plug made of an elastomer material, are additionally covered by the cushion-like raised portions of the tubular cuff of the adjacent plate so that, due to the axial forces also present in this region, the rubber plug sealing the clamping screw of the fastening ring is additionally covered by a press seal.

Another feature of the invention provides that the clamping ring for the press membrane and/or the fastening ring for the filter cloth of a filter plate without a membrane lie on the associated filter plate on an intermediate layer of an elastomer material. This intermediate layer of an elastomer material, which is compressed by the compressive force of the clamping screws, produces a perfect seal for the screw holes and the inserted threaded sleeves in this region as well so that no corrosion is able to develop.

The use of rings to clamp in the press membrane and/or to fix the filter cloth to the filter plate, with the rings being fixed to the filter plate by way of a plurality of clamping screws distributed over its outer edge produces the particular overall advantage that even for the processing of non-aggressive slurries the releasability of these elements is not adversely influenced by deposits and crust formations as this is the case with the use of the tubular clamping sleeves according to the prior art. The use of closing plugs alone for covering the screw heads ensures that, once the closing plugs have been removed in order to exchange the press membrane and/or the filter cloth, the screws, generally internal hexagon screws, are immediately freely accessible. Since due to the fact that the screw holes are sealed, the clamping and/or fastening rings themselves are supported by way of annular intermediate layers of an elastomer material on the respectively associated filter plate and thus no slurry is able to enter on this side either, it is ensured that the clamping screws can be loosened without problems.

BRIEF DESCRIPTION OF THE DRAWINGS

The invention will now be described in greater detail with reference to schematic drawings depicting one embodiment thereof, in which.

DETAILED DESCRIPTION OF THE PREFERRED EMBODIMENT

Figure 1:
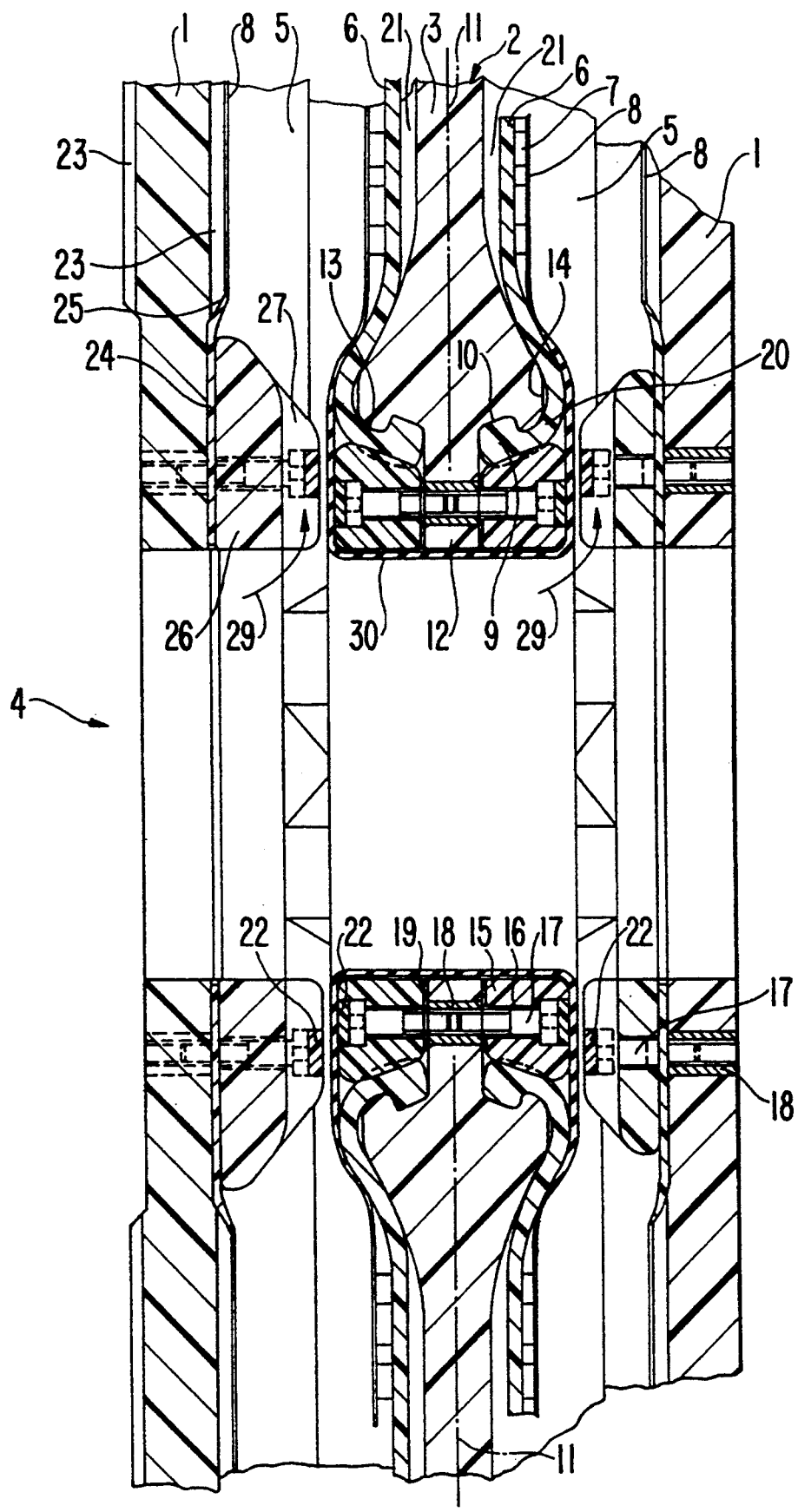
FIG. 1 is a vertical sectional view of the region of the slurry passage through a plurality of filter plates that are pushed together into a stack.
Figure 2:
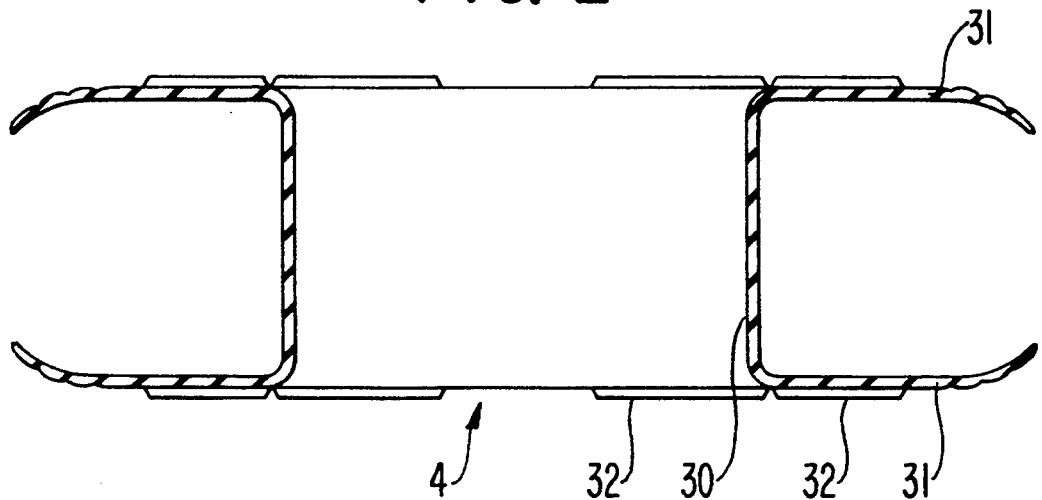
FIG. 2 is a vertical sectional view of a tubular cuff.
Figure 3:
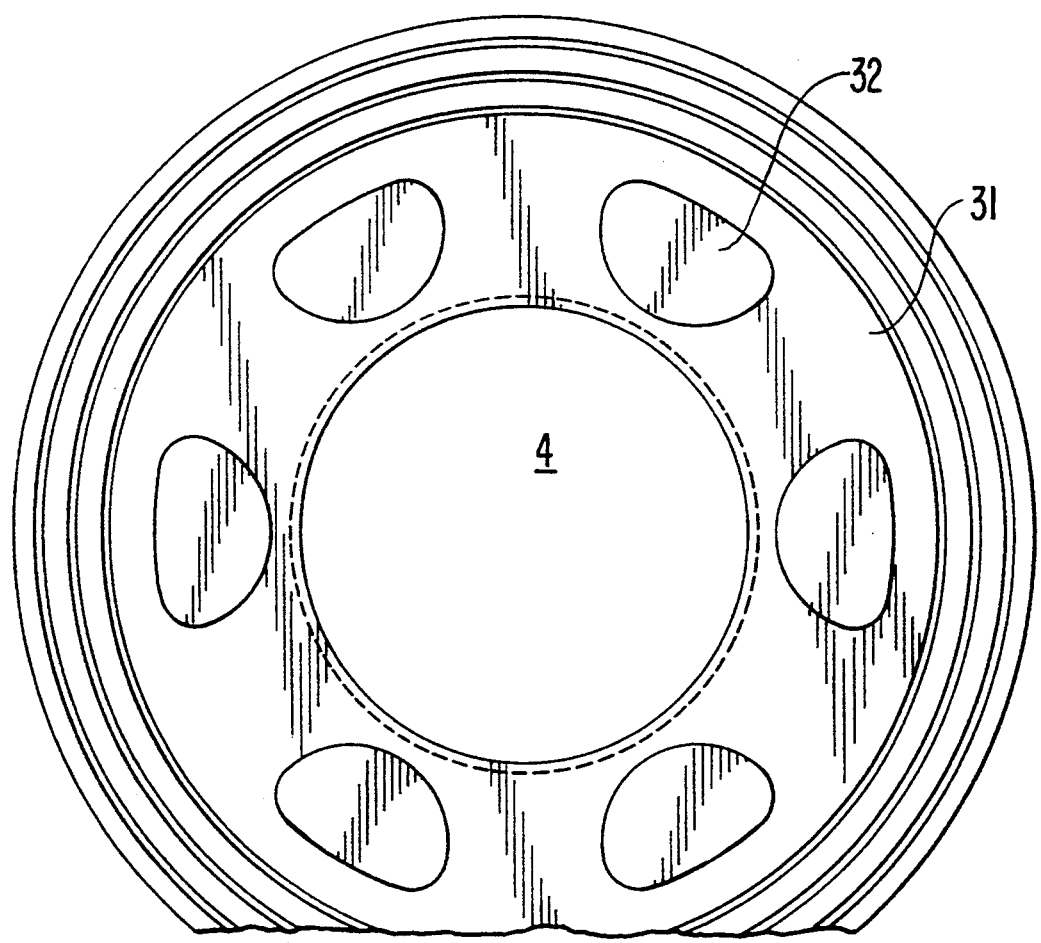
FIG. 3 is a top view of the tubular cuff of FIG. 2.

The partial longitudinal sectional view of FIG. 1 depicts the region of the slurry passage of a filter arrangement pushed together into a stack formed alternatingly of a chamber filter plate 1 and a membrane chamber filter plate 2. Hereinafter, both are called simply filter plates and are differentiated by their reference numerals. If the filter plate is rectangular, square or round, it generally is provided with a slurry passage opening 4 in the center so that, for filter plates that are pushed together into a package, the succession of passage openings 4 of the successive filter plates forms the slurry channel from which the slurry then is able to successively enter into the individual filter chambers 5 disposed between the plates.

In filter plate 2, a heart plate 3 is covered at both sides with a press membrane 6 which, on its side facing filter chamber 5, is provided with a plurality of nubs 7. On this press membrane rests a filter cloth 8 which is supported on nubs 7. Press membrane 6 as well as filter cloth 8 are fixed in the usual manner, which is not of interest here, in the region of the frame enclosing the outside of heart plate 3.

Since passage opening 4 is disposed, for example, always in the center of the filter plates, press membrane 6 and filter cloth 8 also have a passage opening corresponding to that of the filter plate.

As can be seen in FIG. 1, the press membrane 6 of filter plate 2 is provided with an edge bead 9 in the region of its passage opening. The edge bead 9 lies in a corresponding groove 10 in a conically tapering region of the passage opening in filter plate 2, both being delimited by a holding web 12 which is disposed in the region of the center plane 11 of the filter plate and projects beyond grooves 10 toward the center of passage opening 4. The edge region 14 following the conical region 13 is here rounded so that this region of the press membrane is able to place itself closely against the filter plate in the illustrated manner while in the illustrated filtration position. If, however, the space 21 between heart plate 3 and press membrane 6 is charged with a pressure medium, for example water, press membrane 6 inverts itself toward the filter cake in filter chamber 5 without being noticeably stretched in its portion associated with region 14.

Each edge bead 9 is now held in groove 10 on its clamping ring 15 which has a conically shaped outer edge. Clamping ring 15 is provided with a plurality of screw passage holes 16 that are distributed over its outer edge so that the clamping rings can be screwed in with the aid of clamping screws 17 which are each screwed into a threaded metal sleeve 18 held in holding web 12. Clamping rings 15 now do not lie directly on the associated face of holding web 12 but on a correspondingly annular intermediate layer 19 of an elastomer material so that the gap between clamping ring 15 and holding web 12 is sealed against the passage opening forming the slurry channel. Clamping ring 15 is here firmly clamped to holding web 12 by way of clamping screw 17. In the illustrated bilateral arrangement of press membranes, threaded sleeve 18 need not be firmly anchored in the holding web 12 of the filter plate which is preferably made of plastic, since the simultaneous tightening of the screws can here produce a firm tensioning of the two clamping rings against one another.

The compression of the respective edge bead 9 in groove 10 may here be predetermined in a defined manner by appropriately dimensioning the thickness of the edge bead in the radial direction as well as the thickness of the subsequent membrane region 20, on the one hand, and the outer circumference of the conical portion of the clamping ring 15, on the other hand. Since the clamping rings are firmly clamped to one another, the compression of the edge beads 9 forming the seal and the regions 20 is determined independently of the operating pressure of the filter press with respect to the operating pressure in the slurry channel as well as with respect to the operating pressure of the flowable pressure medium that is pressed into the space 21 downstream of the press membrane. The compression of regions 9 and 20 of the press membrane itself does not change even if the mutually adjacent clamping rings and fastening rings lie firmly against one another, as will be discussed in detail below, so that here the clamping rings and the fastening rings are charged with considerable forces in the direction of the slurry channel, that is, in the axial direction.

The end regions of the screw holes 16, after the clamping screws have been tightened, are each closed by a closing plug 22 made of an elastomer material. Closing plug 22 here has an appropriate overdimensional diameter so that it is inserted in a sealing manner. In this way it is ensured that the entire region of screw passage bore 16 including threaded sleeve 18 is hermetically sealed against the slurry channel by the sealing intermediate layers 19 and the closing plugs 22 so that a corrosive attack by the liquid being treated and the formation of deposits which could impede access to the screws is prevented.

The filter plate 1 which delimits filter chamber 5 with respect to filter plate 2 is provided only with a so-called channeling 23 on both sides that extends into the plate edge (not shown in detail here). However, the plate edge axially projects over it. A filter cloth 8 which is likewise provided with a corresponding passage opening lies on this channeling 23 and its edge region is formed by a ring 24 of an elastomer material. Filter cloth 8 is sewn to the outer edge 25 of this ring 24 of elastomer material. By way of this ring 24, the filter cloth is fixed in the region of passage opening 4 with the aid of a fastening ring 26 which in turn is fixed to filter plate 1 with the aid of clamping screws 17 in threaded sleeves 18.

Figure 4:
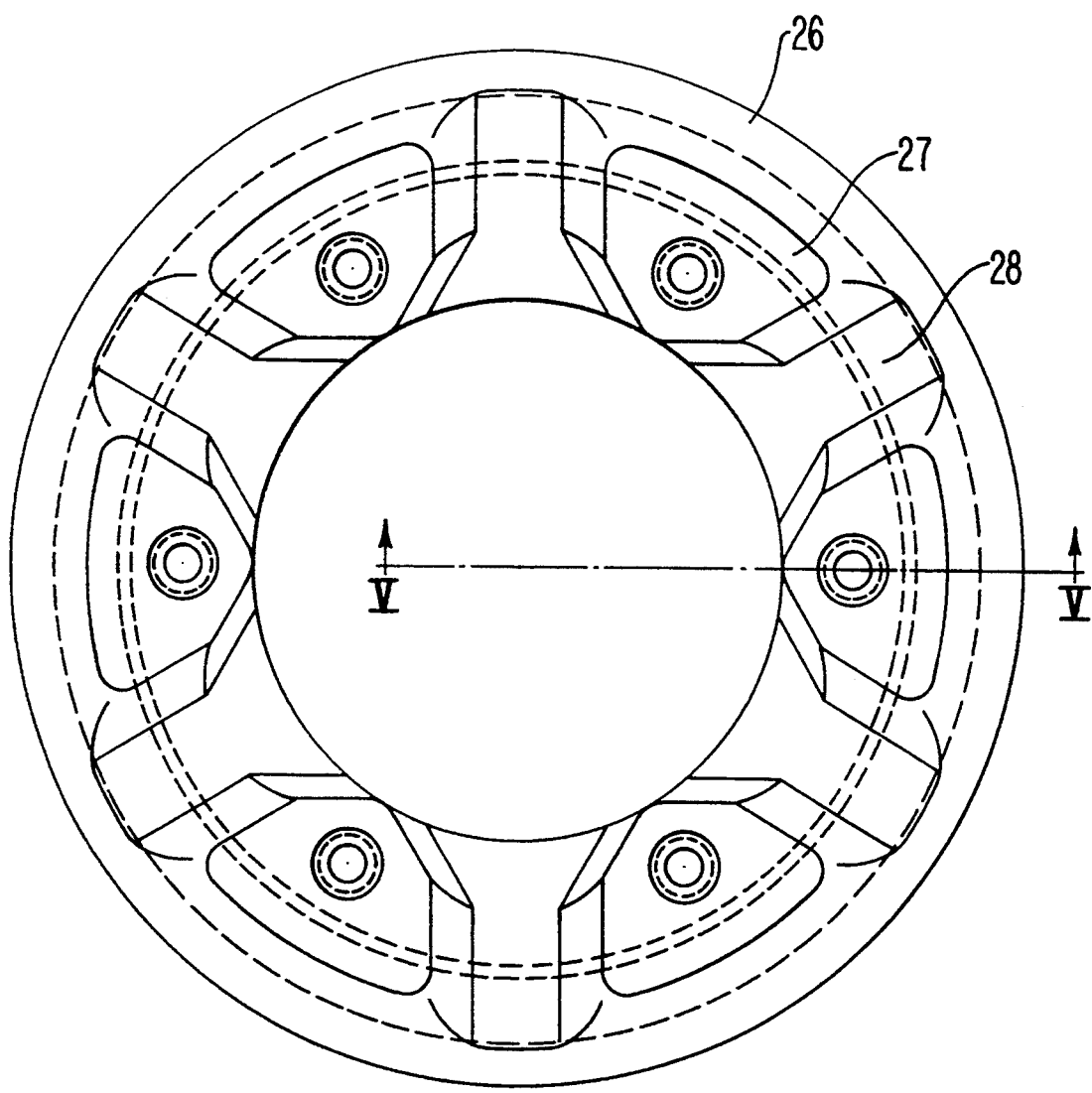
FIG. 4 is a top view of a fastening ring for a filter plate not employing a membrane and FIG. 5 is a partial sectional view along line V—V of FIG. 4 of a fastening ring.
Figure 5:
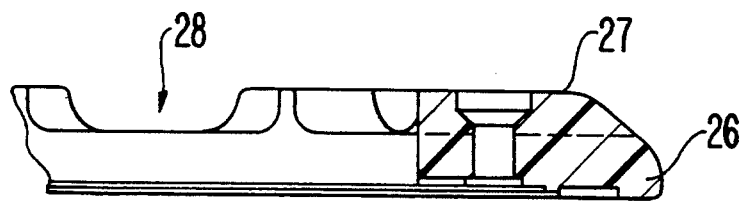

As shown in a top view in FIG. 4 and in a partial sectional view in FIG. 5, fastening ring 26 is provided with a plurality of hump-like projections 27 which are oriented toward the clamping ring 15 of the adjacent filter plate 2. These hump-like projections 27 each delimit radial flow channels 28 emanating from the passage opening, through which the slurry is able to enter into filter chamber 5 from the slurry channel (arrow 29 in FIG. 1).

The clamping screws 17 for fixing fastening ring 26, in turn, are disposed in corresponding screw bores 16 that extend in the region of the hump-like projections 27 and are covered toward the exterior by way of a plug 22 made of an elastomer material.

The wall of passage opening 4 and the clamping rings 15 of filter plate 1 are covered by a tubular cuff 30 of an elastomer material which is provided at both ends with radially outwardly oriented covering flanges 31. The filter cloth 8 is then connected with the free edges of covering flanges 31, for example, by sewing.

A plurality of hump-like raised portions 32 are disposed on the face of covering flanges 31 lying in the plane of filter plate 2, with these raised portions being fixed with respect to their position on the filter plate by means of the connection with the filter cloth. These hump-like projections 32 are here positioned in such a way that they lie opposite the clamping screws 17 for fastening rings 26, with the clamping screws likewise being exactly positioned by their association on filter plate 2 and thus the projections cover the screw passage holes of fastening rings 26. Since the hump-like projections are also made of an elastomer material and lie opposite only the corresponding hump-like projections 27, the screw heads of fastening rings 26 are reliably sealed even under the highest pressure charges when the filter plate stack is pushed together and the hump-like raised portions 32 are thus pressed against the covering flanges. The screw passage holes 16 in clamping rings 15, in turn, are covered by the covering flanges of tubular cuff 30.

I claim:

1. A plate filter press, comprising:
   a filter plate having at least one passage opening and a conically shaped region at an edge of the passage opening of the filter plate which tapers toward a center plane of the filter plate, the conically shaped region including a groove for accommodating an edge bead;
   at least one press membrane covered by a filter cloth and carried by the conically shaped region of the filter plate, the press membrane having a passage opening in common with the passage opening of the filter plate and an edge bead disposed within the groove of the conically shaped region; and
   a fastening element fastened to the filter plate for holding the press membrane to the conical shaped region of the filter plate and the edge bead in sealing contact in the groove.

2. A filter press according to claim 1, wherein the fastening element is fastened to a holding web provided in a region of the center plane of the filter plate, the holding web projecting beyond the groove toward a center of the passage opening of the filter plate.

3. A filter press according to claim 1, wherein the edge of the passage opening is rounded in a region of a largest diameter of the passage opening.

4. A filter press according to claim 2, wherein the fastening element further including a plurality of axial passage bores for screws, and the holding web including threaded sleeves are provided as counterelements for the screws.

5. A filter press according to claim 4, wherein the filter plate and the fastening element are formed from plastic and the threaded sleeves are formed from metal.

6. A filter press according to claim 4, wherein a closing plug is inserted into the passage bores in the fastening element at the conically shaped region end of the filter plate.

7. A filter press according to claim 6, wherein the closing plug is formed from an elastomer material.

8. A filter press according to claim 1, wherein walls of the passage opening and the fastening element are covered by a cuff, the cuff having radially oriented covering flanges projecting away from the passage opening of the filter plate.

9. A filter press according to claim 1, wherein in a region of the passage opening of the filter plate, the filter cloth is connected to the press membrane with a plurality of covering flanges of a cuff.

10. A filter press according claim 9, the filter plate further comprising a fastening ring, having raised portions, for fastening the filter cloth to the filter plate, wherein the plurality of covering flanges include raised portions outer faces of the covering flanges, and wherein when two filter plates are positioned together into a stack, the raised portions of the fastening ring are disposed against the raised portions on the outer faces of the covering flanges.

11. A filter press according to claim 1, wherein the fastening element is on an intermediate layer formed from an elastomer material, the intermediate layer being on the filter plate.

* * * * *